United States Patent [19]

Johnston

[11] Patent Number: 4,511,894

[45] Date of Patent: Apr. 16, 1985

[54] ELECTRONIC DISPLAY APPARATUS USING TIME MULTIPLEXED DATA AND CONTROL SIGNALS

[75] Inventor: Paul M. Johnston, Raleigh, N.C.

[73] Assignee: Westinghouse Electric Corp., Pittsburgh, Pa.

[21] Appl. No.: 331,726

[22] Filed: Dec. 17, 1981

[51] Int. Cl.³ .............................................. G09G 3/10
[52] U.S. Cl. .................................... 340/756; 340/772; 340/791; 340/802
[58] Field of Search ............... 340/713, 772, 782, 791, 340/802, 756

[56] References Cited

U.S. PATENT DOCUMENTS

| | | | |
|---|---|---|---|
| 3,790,850 | 2/1974 | Doane et al. | 340/802 X |
| 3,918,041 | 11/1975 | Mao | 340/756 |
| 4,178,593 | 12/1979 | Kishino et al. | 340/772 X |
| 4,381,505 | 4/1983 | Dion | 340/756 |

OTHER PUBLICATIONS

"Add Interdigit Blanking to Multiplexed Plasma Displays"; Electronic Design; vol. 28, No. 20, p. 148, Sep. 27, 1980.
"Multiplexed Displays Reduce Component Costs"; Electronic Product Design; Sep. 1981; p. 20.
O. I. Nikolaichuk; "Control Circuit for Electroluminescence Display Unit"; Instrum. & Exp. Tech.; vol. 23, No. 3, May-Jun. 1980, (pub. Nov. 1980); pp. 640-642.

Primary Examiner—David L. Trafton
Attorney, Agent, or Firm—William D. Lanyi

[57] ABSTRACT

Display apparatus includes a microcomputer, a multidigit seven-segment display module, and a decoding addressable latch device. The segment inputs of the display module are connected through a buffer to microcomputer output lines to permit the microcomputer to generate seven-segment code. The address inputs of the latch device are connected to the same microcomputer output lines, and the output lines of the latch are connected through a buffer to digit select line of the display device. The microcomputer first generates a digit select address code which is supplied to the latch inputs and frozen there by microcomputer actuation of the latch ENABLE input. This causes the latch to latchably energize the specified digit select line, and the microcomputer outputs the seven-segment code of the desired display character to the segment inputs of the display module. By connecting the latch address inputs and display module segment inputs in parallel, the apparatus provides microcomputer generation of the seven-segment code while reducing the number of microcomputer output lines required.

Objectionable effects of "ghost" energization of undesired segments caused by multiplexing latch address information and display data are minimized by selection of the multiplexed segments according to predetermined criteria, and by deenergizing all segments of all digits when a blank character is to be displayed.

8 Claims, 4 Drawing Figures

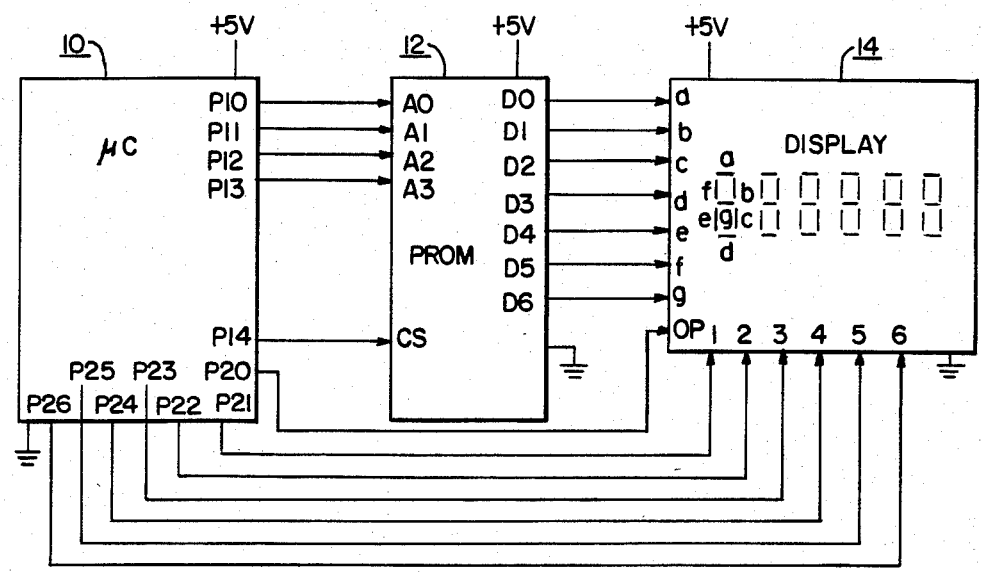
PRIOR ART
FIG.1.
FIG.3.
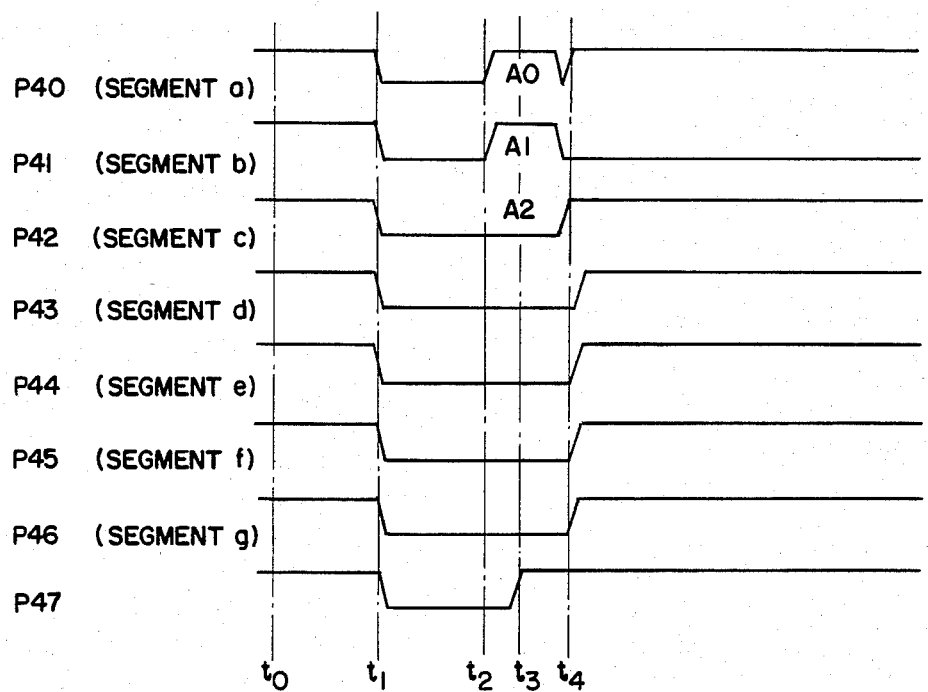

ELECTRONIC DISPLAY APPARATUS USING TIME MULTIPLEXED DATA AND CONTROL SIGNALS

BACKGROUND OF THE INVENTION

The invention relates generally to electronic display apparatus and, more particularly, to apparatus incorporating multi-segment display devices.

Many types of electronic apparatus employ display devices to provide a readout of numeric data. One common type of display device utilizes seven short selectively energizable line segments arranged generally in a figure eight pattern. In order to display a specific character, selected segments are energized to form the desired character.

Each of the separate segments has its own electrode which, when energized in conjunction with a common electrode, causes that particular segment to light up, or in the case of liquid crystal displays, to block or transmit light. Additional apparatus or circuitry must operate in conjunction with the actual display device to interpret the desired numeric quantity and energize the particular electrodes associated with the line segments which must be activated in order to generate the desired character. The set of electrode energization patterns which will cause the desired characters to be formed on this type of display device is known as a seven-segment code. In order to provide the desired character to be displayed, the associated circuitry converts the input data signals into the seven-segment code. This is often accomplished by outputting data from a microcomputer to a separate seven-segment code converter and connecting this to the display. Since it is often desired to provide a multi-digit display, it is common to multiplex the digits such that each digit is rapidly activated in succession by a common seven-segment converter, sometimes ecapsulated as a single unitary multi-digit converter and display module.

Such conventional circuitry works well when only the ten numeric characters must be displayed. However, some applications require that a custom set of characters be displayed in addition to 0 through 9. For example, it is sometimes desired to indicate that the apparatus in question has detected an error condition, and to provide such indication by the display of a special character resembling an E or a backwards 3. In order to provide this and other non-numeric characters in a standard seven-segment display, a separate programmable read-only memory device (PROM) has been effectively utilized in certain applications. However, the use of such a device required extra circuitry. Some small bi-polar PROM's may consume as much power as a typical microcomputer. In addition, they require a tightly regulated 5-volt power supply and often must be operated near maximum output capabilities to provide sufficient current to drive the display device. These disadvantages can be avoided by using the technique of converting the display data to seven-segment code in the microcomputer and connecting the electrodes associated with each segment of the display device directly to the microcomputer. Such technique has been extensively utilized in calculator applications where size and cost are of prime importance. However, this technique requires 13 output lines from the microcomputer (one line for each of 7 segments plus 6 lines to select the desired digit) and in some applications sufficient microcomputer input/output lines were not available.

It would be desirable to provide apparatus incorporating a multi-digit seven-segment display device and a microcomputer for converting the display data to seven-segment code prior to output which would reduce the number of microcomputer input/output lines required.

SUMMARY OF THE INVENTION

In accordance with a preferred embodiment of the present invention there is provided apparatus including a microcomputer and a multi-digit seven-segment electronic display device which provides a custom display character set, while eliminating the need for a specially programmed PROM and associated circuitry. This is provided by time-multiplexing the display data with the display digit control information. The apparatus employs a microcomputer, a multi-digit seven-segment display module with each segment select input connected to a microcomputer output line, and an addressable latch device connected to the digit select lines of the display module and to three of the segment select lines. The display output cycle is divided into three parts. The first part erases the previous display data and turns off the digits. The second portion of the display cycle uses three of the display segment data lines as an address bus. The address code of the next desired digit in the display multiplexing sequence is placed upon the address bus and loaded into the addressable latch. The latch device maintains this address code and transmits it to the digit select terminals of the display device. The third part of the display cycle is to place the seven-segment code of the desired character on the seven output lines connected to the segment select lines of the display device. Although this seven-segment code is applied on top of the three output lines which constitute the address bus, the address data supplied to the digit select lines of the display device is not changed due to the latching action of the latch device. At this time the digit selected by the address code will display the desired character. Thus, only nine input/output lines (eight for data and control signals for the display device and one line for controlling the latch device) are required, rather than fourteen or more as in prior apparatus utilizing on-board microcomputer generation of the seven-segment code.

If desired, buffer devices can be placed between the microcomputer and the display module and between the latch device and the display module in order to convert the logic level signals of the microcomputer and latch device to higher level signals required by certain types of display devices such as fluorescent and electroluminescent devices.

BRIEF DESCRIPTION OF THE DRAWINGS

The invention may be better understood, and further advantages and uses thereof more readily apparent when considered in conjunction with the following detailed description of exemplary embodiments, taken with the accompanying drawings, in which:

FIG. 1 is a schematic diagram of display apparatus constructed according to the teachings of the prior art;

FIG. 3 is a timing diagram of a display output cycle of the apparatus shown in FIG. 2.

DESCRIPTION OF THE PREFERRED EMBODIMENTS

Figure 2:
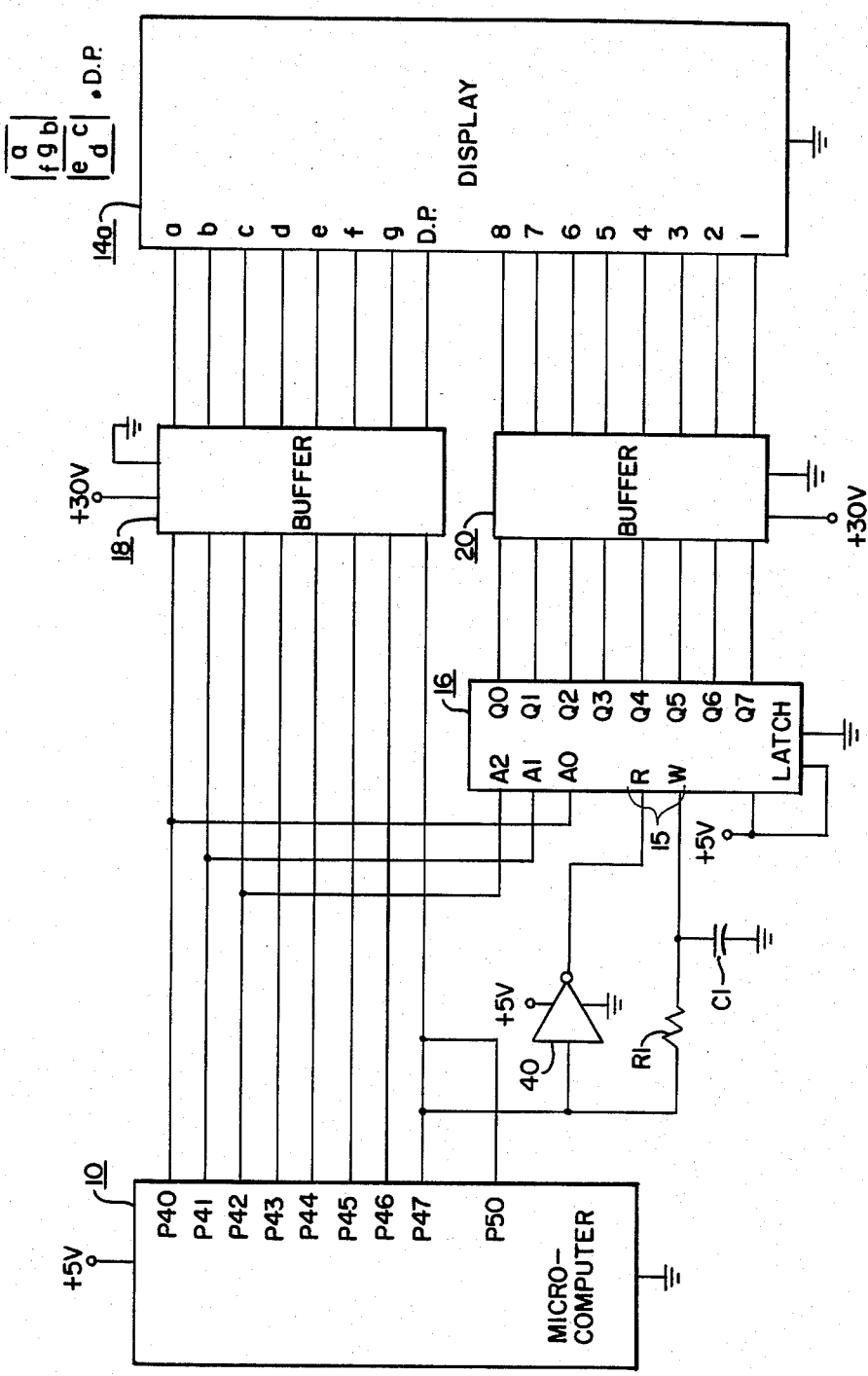
FIG. 2 is a schematic drawing of display apparatus incorporating the principles of the present invention.

Throughout the following description, similar reference characters refer to similar elements or members in all of the figures of the drawing.

Referring now to FIG. 1, there is shown a schematic diagram of display apparatus constructed according to the teachings of the prior art. The apparatus includes a microcomputer 10, a PROM 12 and a six-digit seven-segment LED display device 14. The microcomputer 10 includes two output ports and a plurality of output lines P10-P14 and P20-P25. The output lines P10-P13 are directly connected to address inputs A0-A3 of the PROM 12. An additional output line P14 is connected to the PROM 12 at the CS input thereof.

The output lines P21-P26 are connected to digit select lines 1-6 of the display device 14. Output line P20 is connected to the decimal point input DP of the display 14.

The PROM 12 includes data outputs D0-D6 which are connected to segment select lines a-g of the display 14.

As can be seen, the display 14 includes six sets of light emitting diodes (LED's) arranged in groups of seven line segments. Each of the sets corresponds to one of the digit select lines 1-6. Each of the segment select lines a-g corresponds to one line segment in each of the six groups of LED's. In operation, energization of one of the digit select lines 1-6 will cause the corresponding digit 1-6 to be selected. Energization of one or more of the segment select lines a-g will cause the corresponding line segment a-g of the selected digit to be illuminated. For example, if digit select line 1 and segment lines a, b, and c are each energized, the figure 7 will appear in digit 1.

This and other permissible combinations of energizations of segment select lines and the corresponding characters are stored in the PROM 12 according to Table I below, with energization of a segment indicated by a 1 and non-energization indicated by a 0.

TABLE I

| ADR | g | f | e | d | c | b | a | character |
|-----|---|---|---|---|---|---|---|-----------|
| 200 | 0 | 1 | 1 | 1 | 1 | 1 | 1 | 0 |
| 201 | 0 | 0 | 0 | 0 | 1 | 1 | 0 | 1 |
| 202 | 1 | 0 | 1 | 1 | 0 | 1 | 1 | 2 |
| 203 | 1 | 0 | 0 | 1 | 1 | 1 | 1 | 3 |
| 204 | 1 | 1 | 0 | 0 | 1 | 1 | 0 | 4 |
| 205 | 1 | 1 | 0 | 1 | 1 | 0 | 1 | 5 |
| 206 | 1 | 1 | 1 | 1 | 1 | 0 | 1 | 6 |
| 207 | 0 | 0 | 0 | 0 | 1 | 1 | 1 | 7 |
| 208 | 1 | 1 | 1 | 1 | 1 | 1 | 1 | 8 |
| 209 | 1 | 1 | 0 | 1 | 1 | 1 | 1 | 9 |
| 20A | 1 | 1 | 1 | 1 | 0 | 0 | 1 | E |
| 20B | 1 | 1 | 1 | 0 | 1 | 1 | 0 | H |
| 20C | 0 | 1 | 1 | 1 | 0 | 0 | 0 | L |

Table I contains what is known as a seven-segment code, in that each of the listed combinations of energizations of the seven segments of a display device will cause the character indicated by the right-hand column of Table I to appear upon the display device. Although it would be possible to provide a separate PROM for each digit, it was more economical in the prior art to provide the arrangement shown, whereby multiplexing of the digits would take place. In other words, each of the digit select lines would be sequentially energized concurrently with the desired pattern of segment select lines, in a rapidly repeating sequence of a frequency such that the human eye would integrate the display to perceive a continuous six-digit display instead of the sequential pattern of single digit-by-digit illumination which was actually taking place. In operation, the microcomputer 10 would cause a number from 0 to 15 (O through F in hexidecimal notation) to appear in binary form on the output lines P10-P13, which binary quantity would also appear at the address inputs A0-A3 of the PROM 12. Next the microcomputer would energize the chip select line CS, causing the PROM to output a pattern upon its data lines D0-D6 to the segment select lines a-g according to Table I above. The microcomputer would then energize one of the output lines P21-P26 causing the digit select line 1-6 of the desired digit to be energized. The desired character would then appear, defined by the related lines of the seven segments of the desired digit. The microcomputer would repeat this process incrementing the number of digit selected, while providing an output corresponding to the desired display character. In this manner, the entire desired display would appear in such rapidly rotating sequence that the human eye would interpret the result as a continuously illuminated six-digit quantity.

The arrangement hereinbefore described provided generally satisfactory service under many conditions. However, the PROM 12 often consumed as much power as the microcomputer 10. This is a considerable disadvantage when operated under conditions of limited power availability or in confined areas where power dissipation would lead to unacceptably high temperatures. In addition, if large numbers of such display apparatus are operated, the total power dissipation can be extremely high, resulting in undesirably high costs. Furthermore, the PROM 12 requires a tightly regulated 5-volt power supply, which also results in unacceptably high cost for high volume applications. In addition, the current required to drive the display device 14 may severely tax the PROM 12 and microcomputer 10 since they may be operating close to their maximum output current under such conditions.

In order to avoid some of the above-mentioned problems, an alternative prior art technique provided that the display device 14 would be directly connected to the microcomputer 10. The conversion of data to seven-segment code would take place in the microcomputer 10. This technique provided acceptable results in certain applications. However, it can be appreciated that in order to implement this technique each of the segment select lines a-g and digit select lines 1-6 would required a separate output line of the computer, as would the decimal point input DP. Thus, a total of fourteen output lines of the microcomputer 10 would be required. In many applications, there simply are not sufficient output pins on the microcomputer to allow the uasge of this technique.

To avoid the problems of the prior art discussed above, the present invention provides electronic display apparatus as shown in FIG. 2. A microcomputer 10 is provided in the same manner as the prior art. In addition, the display module can be an identical six-digit LED seven-segment display 14 as shown in FIG. 1. Alternatively, however, an eight-digit seven-segment vacuum fluorescent display 14a is shown in FIG. 2. The display 14a may be a type FIP 9J5 display manufactured by the Nippon Electric Corporation. Other types of multi-segment display devices having a greater or lesser number of digits and segments per character could of course be used. A decoding addressable latch 16 includes address inputs A0–A2, a two-terminal ENABLE input 15 comprising terminals R and W, and data outputs Q0–Q7. The decoding addressable latch device 16 may, for example, be a type MC14099B device generally available from the Motorola Corporation.

The microcomputer 10 may be, for example, a type 3870 generally available from the Mostek Corporation. A more detailed description of the type 3870 microcomputer is obtainable in the Mostek Microcomputer Data Book published by the Mostek Corporation.

A type UDN6118A buffer 18 generally available from the Sprague Corporation is shown in FIG. 2 connected between the output lines of the microcomputer 10 and the display module 14a. The purpose of this device is to convert the logic level signals from the microcomputer 10 to the 30-volt level signals required by the vacuum fluorescent display module 14a. It is to be understood that alternative embodiments of the invention may utilize display modules employing LED's which are operable from logic level signals and will thus not require the buffer device 18. Similarly, FIG. 2 shows a buffer device 20 which may be a type UDN6118A also available from the Sprague Corporation. It is also to be understood that the purpose of the buffer device 20 is to convert the 5 volt level signals from the latch device 16 to the 30 volt level signals required by the vacuum fluorescent display module 14a, and that alternative embodiments of the invention which are operable at the signal levels provided by the output lines of the addressable latch 16 may not require the buffer device 20.

Referring to FIG. 2 it can be seen that output lines P40 through P46 are connected through the buffer device 18 to corresponding segment select inputs a through g of the display module 14a. Similarly, the output line P50 of the microcomputer 10 is connected through the buffer device 18 to the decimal point input DP of the display module 14a. Ground connections and connections to a 5-volt power supply are provided for the microcomputer 10 and the addressable latch 16. Similarly, ground connections and 30-volt power supply connections are provided for the latch devices 18 and 20 and the vacuum fluorescent display module 14a.

Outputs Q0 through Q7 of the addressable latch 16 are connected through the buffer device 20 to corresponding digit select lines 1 through 8 of the vacuum flourescent display module 14a. Activation of any of the digit select lines 1 through 8 to a high, or logic one, level will select the corresponding digits of the display module 14a. Subsequent energization of one or more of the segment select inputs a through g to a high, or logic one, level will cause corresponding character line segments a through g to be lighted or activated in each of the digits for which a digit select line is energized.

The address inputs A0, A1, and A2 of the latch device 16 are connected to the microcomputer output lines P40, P41, and P42, respectively. The address lines A0, A1, and A2 are thus connected in parallel (through the buffer 18) to the segment inputs a, b, and c of the display module 14a.

The CLR and D inputs to the latch device 16 are connected to the 5-volt supply for the purpose of disabling the CLEAR function and assigning a logic 1 to the addressable latch 16 data input.

Briefly, the invention operates to display information in the following manner. The display data is time multiplexed with the display digit control information by breaking the display output cycle into three parts. The first part erases the previous display data and turns off the digits. This provides an interdigit blanking time period and reduces "ghosting". The second portion of the display cycle uses output line P40, P41, and P42 (also connected to the three display segment data lines a, b, and c) as an address bus so that the next digit to be illuminated in the display multiplexing sequence is addressed by outputting its address code to the address inputs of the addressable latch. This address code is frozen in the latch device 16 by actuating the ENABLE input by momentarily setting the output line P47 of the microcomputer to a logic zero. This has the effect of clearing all output lines of the addressable latch 16 and then transferring the bit pattern appearing on microcomputer output lines P40, P41, and P42 to the address inputs of the latch device 16. This directs the latch device 16 to energize that one of its output lines Q0 to Q7 which corresponds to the bit pattern appearing at the address inputs A0, A1, and A2. Thus, the selected latch output line drives (through the buffer 20) the corresponding digit select line of the display module to an energized condition. The selected latch output line remains energized, or latched, even after the output line P47 returns to a logic 1.

The third step of the display output cycle is for the microcomputer 10 to place the display data code, that is, the desired seven-segment code, on the output lines P40 through P46 so that the digit selected by the previous step will display the desired character.

The ENABLE input of the latch device 16 utilizes a two-terminal control scheme which defines four operational states of the latch device as shown in the truth table of Table II, below:

TABLE II

| State | W Write Disable | R Reset | Signal Appearing on Addressed Latch Output Lines | Siganl Appearing on Unaddressed Latch Output Lines |
|---|---|---|---|---|
| 1 | 0 | 0 | 1 | Qn* |
| 2 | 0 | 1 | 1 | 0 |
| 3 | 1 | 0 | Qn* | Qn* |
| 4 | 1 | 1 | 0 | 0 |

Qn* is previous signal on this latch output line

In the present embodiment, states 2 and 3 are the states of interest. Because the latch device 16 is to be controlled from only one microcomputer pin (P47), an inverter 40 is employed. In the present embodiment, P47 of the microcomputer is also shared with another function (not shown) which requires P47 be a logic 1 except for brief excursions to the logic 0 state. Therefore the inverter 40 must be placed between P47 of the microprocessor and the R terminal of the latch device 16.

The inverter 40 has a small, but finite, propagation delay. This delay is less than 350 ns. However, with component variations and over temperature this delay may be long enough that states 1 and 4 are sometimes recognized by the latch device 16 during transitions of P47 of the microcomputer. The state transitions must be arranged in such a fashion so that an unintended state does not destroy the latched information in the latch 16. The desired state transitions are therefore, state 3-state 4-state 2-state 1-state 3, to latch the address information to the display. To achieve this state transition scheme, resistor R1 and capacitor C1 are introduced between terminal W of the latch 16 and P47 of the microcomputer. R1 and C1 are chosen so that the delay for the transition of P47 of the microcomputer to reach terminal W of the latch 16 is longer than the worst case propagation delay of inverter 40 and the associated line. If this is not done, the natural state transition would be state 3-state 1-state 2-state 4-state 3 and the latched address would be destroyed by entering state 4 after entering state 2.

R1 and C1 would not be necessary if P47 of the microcomputer could be normally a logic 0 and the inverter 40 were in the line feeding terminal W the latch 16 instead of terminal R. In this mode of operation the propagation delay of inverter 40 would assure the proper state progression.

The sequence of the complete display output cycle can be seen more clearly in FIG. 3, wherein the voltage levels appearing on microcomputer output pins P40 through P47 are shown. As can be seen, the voltage levels vary from a logic zero to a logic one condition. At time $t_o$, output pins P40 through P46, corresponding to segment select lines a through g are activated. P47 (the ENABLE control) is at a logic 1 condition; however, due to the latching action of the latch device 16, the previously specified digit select line remains activated. Since all seven segment lines are in a logic one condition, correspondingly all segments of the selected digit will be illuminated. Thus, the character "8" will be illuminated in the previously selected digit.

The falling edge of the P47 signal at time $t_1$ signals the beginning of the three-part data display operation. This causes the addressable latch 16 to deactivate all of the output lines Q0 through Q7, thus deenergizing all of the digit select lines of the display module 14a. All line segments of all digits of the display module 14a thus go dark.

At time $t_2$ the microcomputer 10 activates the output lines P40 and P41, connected to segment inputs a and b, respectively, and latch address inputs A1 and A0, respectively. However, no digit select lines are energized at this time since the P47 signal remains in a logic 0 condition. At time $t_3$, the microcomputer 10 outputs a logic 1 on P47, causing the signal to rise. The rising edge of the P47 signal causes the latch 16 to interpret the bit pattern appearing at its address inputs as a number and energizes the corresponding latch output Q0 through Q7. As can be seen in FIG. 3, address inputs A0 and A1 are the logic high condition, represented as 011. This binary number is equal to a decimal 3. Thus, the address output Q3 is energized, causing corresponding energization of the digit select line 5.

The third step of the data output cycle begins when the microcomputer 10 places a logic one on the microcomputer output pins P40 and P42-P46. Segment select lines a and c-g thus rise to a logic one condition, causing corresponding segments a and c-g of digit 5 (specified by the energization of the digit select line 5) to be illuminated. The character "6" will therefore be illuminated in digit 5 of the display module 14.

Under certain operating conditions it becomes desirable to further reduce "ghosting". The term "ghosting" refers to the display of unwanted characters on the display device caused by momentary supplying address information on the display device segment select input lines.

The most noticeable "ghost" occurs upon digits which are to have no character displayed upon them; that is, they are to show a blank. The faint "ghost" caused by the address information thus appears contrasted against the dark background instead of against other brightly lit segments. The present invention avoids the display of a "ghost" on a blank character by providing means for rendering all latch device address inputs inactive whenever a blank character is to be display in a digit position. Thus no display device digit select inputs are activated and no "ghost" appears. Although separate circuit devices could be provided to implement the invention, the present embodiment utilizes the microcomputer to render the latch device address inputs inactive in a manner to be described hereinafter.

Although the "ghosting" effect is most noticeable on blank characters, under conditions of low ambient illumination non-blank characters may also have a visible ghost. In the present embodiment, only three of the seven segment select inputs to the isplay device are connected to address inputs of the latch device. Thus, only three of the seven segments of each digit are subject to a "ghost". The present embodiment minimizes the severity of the "ghosting" problem by selecting the three segments out of seven on which "ghosting" is least objectionable.

TABLE III

| Segment I.D. | Number of Characters Segment Appears In | Number of Characters Ghosting Would Charge Digit Value |
| --- | --- | --- |
| a | 8 | 1 |
| b | 8 | 2 |
| c | 9 | 0 |
| d | 7 | 0 |
| e | 4 | 2 |
| f | 6 | 1 |
| g | 7 | 1 |
| D.P. | Unknown | 0 |

Table III lists each segment, the number of numeric characters (i.e., 0 through 9) in which the segment appears illuminated, and the number of numeric characters in which illumination of the segment would change the character's value, that is would cause a misreading of the desired value. As can be seen from the table, segment c is the segment for which undesired illumination would cause the least problems. This segment, which is the vertical segment on the lower right-hand side of the character, is illuminated for nine out of the ten numeric characters. Thus if this segment is faintly flashed for a short time before the desired character is illuminated, it will be totally unnoticeable since the segment will immediately thereafter be lit to full brilliance. The character "2" is the only numeric character which does not utilize segment c. Thus it is possible that a "ghost" display of segment c immediately before a "2" is displayed would cause that segment to be faintly visible in the rapidly multiplexed multi-digit display presentation. However, there is little change of misreading the character since a "2" with segment c added is not a valid numeric character and an observer could readily discern the brightly lit desired segments from the faint segment c and determine that a "2" was actually displayed.

Segments a and b appear illuminated in eight out of ten numeric characters and "ghosting" on these eight characters would similarly be totally invisible on a multiplexed display. These segments are therefore chosen to be the other two whose segment select lines are also tied to latch address inputs. It is possible for some applications having low ambient illumination and a requirement that misreading be absolutely minimized for other segments such as d, f or g to be chosen, since those segments have fewer characters wherein ghosting could be read as a valid character. In any case, the three latch address inputs should be connected with the three segment select inputs corresponding to those segments which are determined to minimize the undesirable effects of "ghosting" according to specified criteria.

Figure 4:
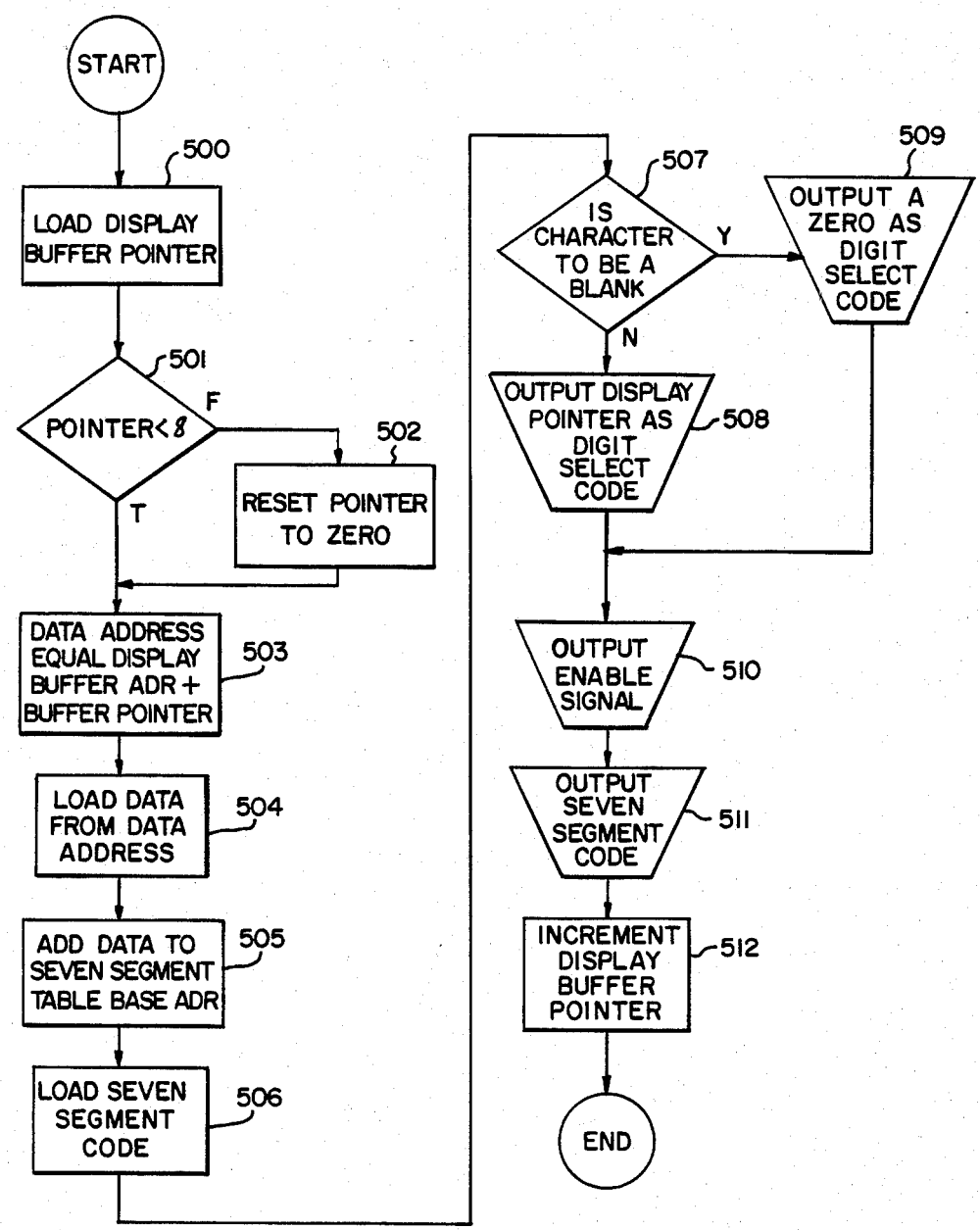
FIG. 4 is a flow chart of the display output cycle.

FIG. 4 shows a flow chart of instructions stored into memory of the microcomputer 10 to implement the previously described display sequence. This instruction sequence will now be described in conjunction with Table I and Table IV. Table IV is a partial map of the random access memory of the microcomputer 10, which comprises a digit value data table. This portion of the microcomputer memory stores the values which are to be displayed in each of the eight digits of the display module 14a. For purposes of example, the addresses shown have been assigned to the table entries. The base address of the digit value data table is 100 hex.

Table I is stored as a second portion of the memory of the microcomputer 10 which contains the seven-segment code conversion table. The base address of the Table I is 200 hex. Also indicated in Table I are the characters represented by the data values shown. It can be seen, for example, that the seven-segment code value necessary to generate the character "0" is 0111111. This indicates that six of the seven segments should be illuminated in order to form the character "0", with segment g remaining dark. In a similar manner in order to display the character "H" the following data value is required: 1110110. This indicates that all segments except segment a and segment d should be illuminated in order to generate the character "H" on the display module.

TABLE IV

| ADR | Name | Value |
| --- | --- | --- |
| 100 | Digit #1 | Character to be displayed in Digit #1 |
| 101 | Digit #2 | Character to be displayed in Digit #2 |
| 102 | Digit #3 | Character to be displayed in Digit #3 |
| 103 | Digit #4 | Character to be displayed in Digit #4 |
| 104 | Digit #5 | Character to be displayed in Digit #5 |
| 105 | Digit #6 | Character to be displayed in Digit #6 |
| 106 | Digit #7 | Character to be displayed in Digit #7 |
| 107 | Digit #8 | Character to be displayed in Digit #8 |

In operation, the microcomputer calculates the eight-digit value which must be displayed on the display module 14a. The value of each digit of this eight-digit quantity is stored in the corresponding location of the digit value data table in the computer memory as shown in Table IV. The value of the leftmost digit of the eight digits, digit #1, is stored in computer memory at location 100. The value of the second digit from the left, digit #2, is stored in computer memory at location 101. In a similar manner the values of the remaining digits are stored in memory in the digit value data table in the remaining locations.

An initial value of a digit value data table pointer is stored in a specified location in computer memory when the microcomputer is initialized. This pointer indicates which one of the eight digits of the display module 14a will be illuminated by this display output execution cycle. Step 500 of FIG. 4 specifies that the digit value data table pointer is loaded into the microcomputer accumulator. Next, in step 501, the value of the pointer is checked to determine if it is less that 8. If this is the case, the procedure continues to step 503. If, however, the value of the digit value data table pointer is equal to or greater than 8, this indicates that all the digits have been displayed. The pointer is then reset to zero in step 502 so as to point back to the first location of the digit value data table. At step 503 the specific address within the digit value data table which contains the proper value to be displayed is calculated by adding the base address (100) of the digit value data table to the digit value data table pointer. The data contained in this location is then loaded into the accumulator in step 504. This value is then used to determine the location in the seven-segment code table which contains the seven-segment code for the desired display character. The data from the digit data table is added in step 505 to the base address 200 of the seven-segment code table to get the value of the specific table entry address. The specific seven-segment code contained in this address is then loaded by step 506.

Next, a check is made at 507 to determine if the character to be displayed is a blank. If so, a value of zero is applied at 509 to the latch address inputs to deactivate all digit select inputs. Thus a digit in which it is desired to display a blank will be completely dark, and no faint "ghost" display of the address data will appear.

If a non-blank character is to be displayed, the microcomputer 10 then places the value of the digit value data table pointer on output lines P40, P41, and P42, as specified in step 508. As previously mentioned, this number is used by the addressable latch 16 to energize the digit select line of the desired digit on display module 14a. Step 510 completes this process by commanding the microcomputer 10 to energize pin P47 to strobe the ENABLE input to cause the latch 16 to energize the specified output Q0–Q1, thus causing the desired digit select line to be energized. Step 511 indicates that the microcomputer 10 then takes the value stored in the specified address of the seven-segment code table and outputs this bit pattern on output lines P40 through P46. This activates the desired segment select lines of the display module 14a and, since the digit select line has previously been latchably energized, the desired character is now displayed in the proper digit on the display module 14a. The final step 512 in the display control algorithm is to increment the digit value data table pointer in preparation for the next execution cycle to cause the next digit to be displayed. In order for the eight-digit display to appear to be continuously illuminated to the eye of the observer, it is necessary that the display cycle be executed by the microcomputer 10 at least once every millisecond. The display control sequence may be incorporated as a portion of a main program loop or it may be used as a separate subroutine.

The disclosed apparatus provides electronic display apparatus which incorporates a multi-digit multi-segment display module to be operated by a microcomputer, while exhibiting lower power dissipation and increased simplicity over the prior art. In addition, the number of microcomputer output pins required is reduced over the prior art, thereby permitting the generation of the proper multi-segment code within the microcomputer in applications not heretofore possible.

I claim:
1. Electronic display apparatus, comprising:
    a display device comprising a plurality of digits and a like number of digit select inputs, each digit comprising a plurality of character segments selectively energizable to form a set of display characters and a like number of segment inputs the energization of which produces energization of the corresponding character segment;

an addressable latch device comprising an ENABLE input, a plurality of address inputs, and a plurality of outputs each connected to one of said digit select inputs and selectable by a unique pattern of energization of said latch address inputs, the selected output being latchably energizable upon actuation of said ENABLE input;

a microprocessor for generating said latch address input energization patterns, for generating data to be displayed, and for converting said display data to a multi-segment code to energize the proper display device segments to display said data, said microprocessor comprising a plurality of data outputs each connected to one of said segment inputs, said data outputs also being connected in parallel to said latch address inputs, said microprocessor comprising a control output connected to said ENABLE input; said microprocessor energizing in sequence said data outputs with the latch address input pattern corresponding to the desired digit, said control output, and said data outputs with the multi-segment code for the desired character.

2. Apparatus as recited in claim 1 wherein the number of latch device outputs is greater than the number of latch device address inputs, and said addressable latch device is a decoding addressable latch device.

3. Apparatus as recited in claim 1 wherein said display device comprises a seven-segment display device.

4. Apparatus as recited in claim 1 comprising first buffer means connected between said data outputs and said segment inputs for converting logic level signal levels to signals compatible with said segment inputs.

5. Apparatus as recited in claim 1 comprising second buffer means connected between said latch outputs and said digit select inputs for converting logic level signal levels to signal levels compatible with said digit select inputs.

6. Apparatus as recited in claim 4 or 5 wherein said display device comprises a vacuum fluorescent display device.

7. Apparatus as recited in claim 2 wherein said microprocessor comprises means for deenergizing all digit select lines prior to energization of the desired digit select line.

8. In a multiplexing display system having a microprocessor and a multidigit, multisegment display device, an improved method of displaying data comprising the steps of:

generating the desired display data, generating a multisegment code within the microprocessor corresponding to one digit of said display data;

generating an address code within the microprocessor corresponding to said desired digit, outputtting said address code on a first set of microprocessor output lines to a decoding addressable latch device connected to digit select inputs of said display device, outputting a control signal from said microprocessor to said latch device which causes said latch device to latchably energize the digit select input corresponding to the desired digit, and outputting said multisegment code on a second set of microprocessor output lines connected to the segment select inputs of said display device, said second set of microprocessor output lines including said first set.

* * * * *